F. C. COSEO.
SUPPORT FOR ELECTRIC TROLLEY MECHANISM.
APPLICATION FILED FEB. 13, 1904. RENEWED DEC. 8, 1909.
1,091,734.
Patented Mar. 31, 1914.
2 SHEETS—SHEET 1.
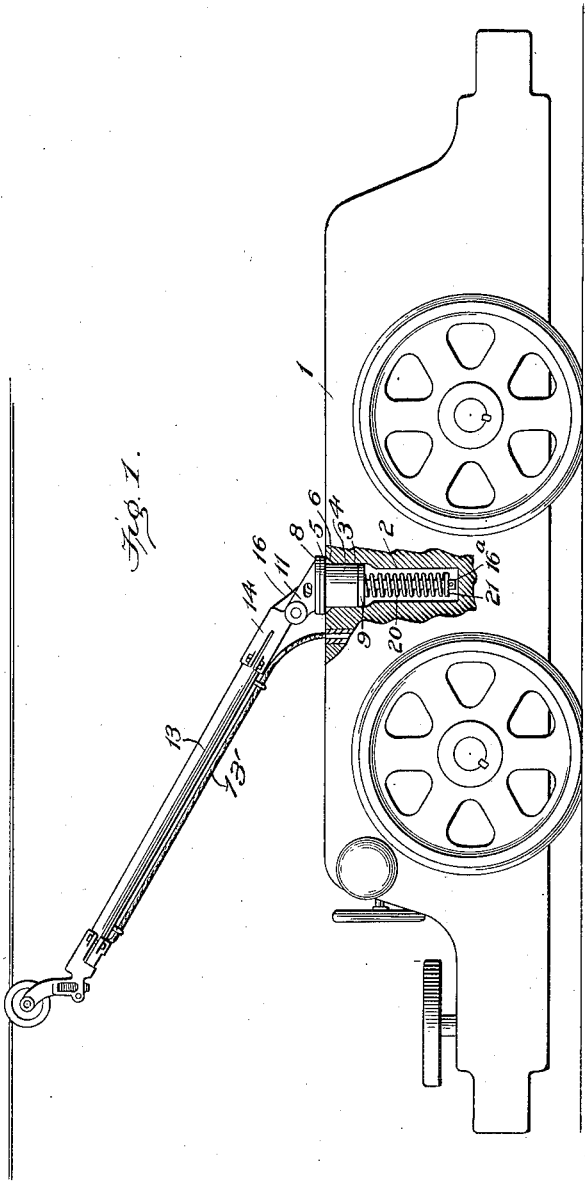
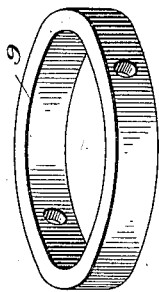
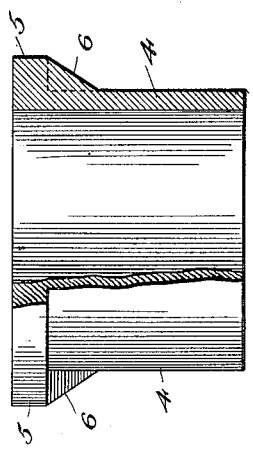
Witnesses:
Edwin L. Bradford
Lewis T. Boynton
Inventor
Fred C. Coseo,
By H. H. Bliss.
Attorney

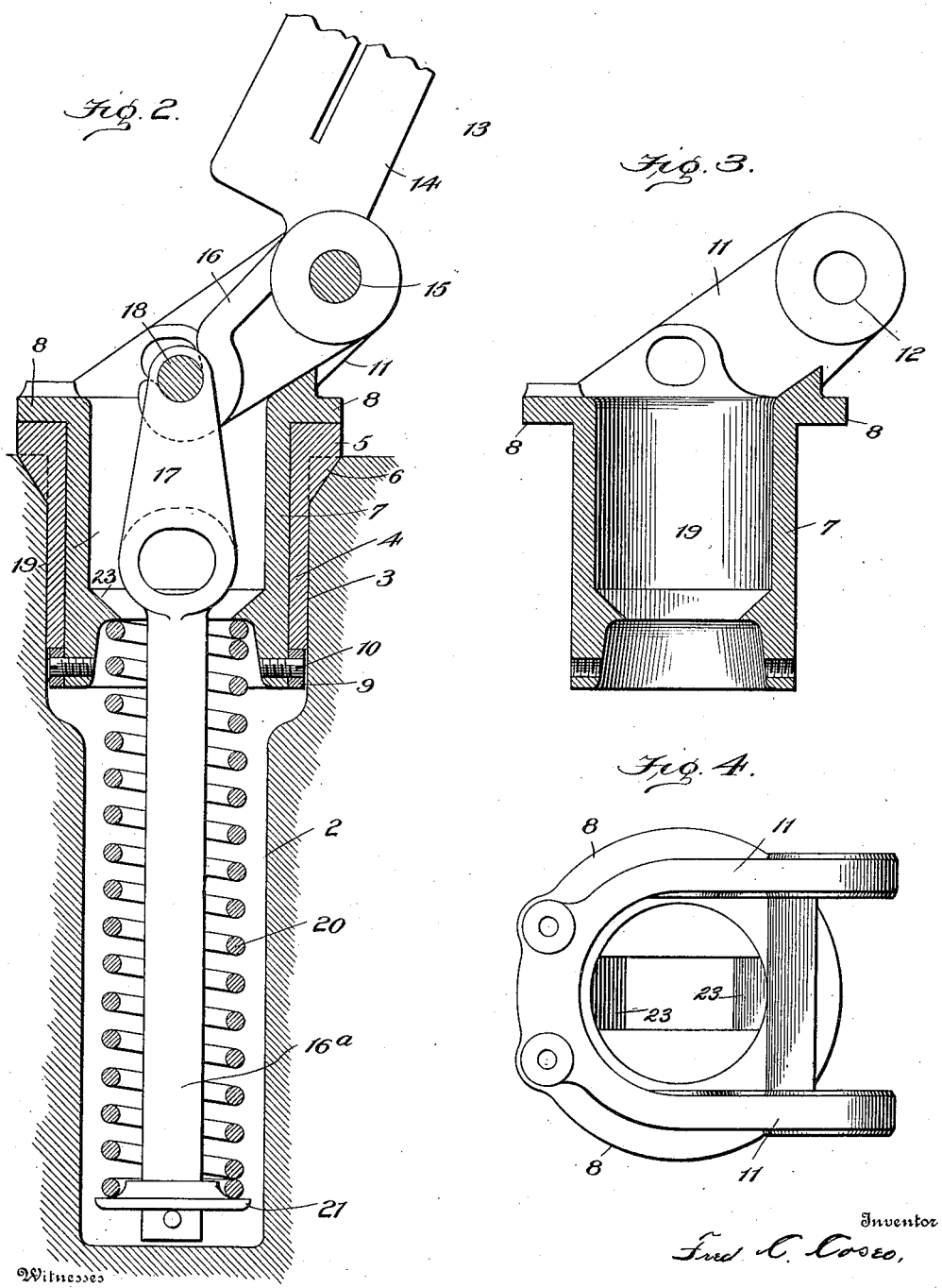

UNITED STATES PATENT OFFICE.

FREDERICK C. COSEO, OF COLUMBUS, OHIO, ASSIGNOR, BY MESNE ASSIGNMENTS, TO THE JEFFREY MANUFACTURING COMPANY, A CORPORATION OF OHIO.

SUPPORT FOR ELECTRIC TROLLEY MECHANISM.

1,091,734. Specification of Letters Patent. Patented Mar. 31, 1914.

Application filed February 13, 1904, Serial No. 193,452. Renewed December 8, 1909. Serial No. 532,034.

*To all whom it may concern:*

Be it known that I, FREDERICK C. COSEO, a citizen of the United States, residing at Columbus, in the county of Franklin and State of Ohio, have invented certain new and useful Improvements in Supports for Electric Trolley Mechanism, of which the following is a specification, reference being had thereto to the accompanying drawings.

This invention relates to improvements in trolley devices and trolley supporting apparatus adapted for use on electric cars, particularly locomotives of the class used for haulage purposes in and about mines and similar places.

One of the objects of my invention is to provide a trolley supporting mechanism with its parts so connected and arranged that they can be positioned below the top surface of a car or locomotive frame.

A further object of the invention is to provide a mechanism which is entirely self-contained, which is compact, and which may be readily attached to or detached from a car or locomotive.

Figure 1 is a side view of a locomotive having attached thereto a trolley mechanism embodying my improvements some of the parts being broken away in order that others may be more clearly illustrated. Fig. 2 is a vertical central section of the lower part of the trolley apparatus. Fig. 3 is a vertical cross sectional view through the base. Fig. 4 is a plan view of the trolley base. Fig. 5 is a view partly in elevation and partly in cross section of the socket for the trolley base. Fig. 6 is a perspective view of the ring which is secured to the lower end of the trolley base.

At 1 is indicated a car of the sort to which a trolley apparatus of this kind can be applied. The car illustrated is a mining locomotive. It is well known that in a mining locomotive it is necessary to economize space both vertically and laterally because of the contracted passageways through which the locomotive must travel. In the present instance the car and the trolley apparatus are so constructed and related that nothing of consequence is allowed to project above the top of the car except the trolley arm itself.

The side parts of the car or locomotive are made of relatively large castings. In one or in each of the side castings at a suitable point between the ends of the car there is formed a cavity or chamber, indicated by 2. This can be somewhat contracted at the lower part, but preferably is expanded or widened near the top of the car, as shown at 3.

4 indicates a bearing sleeve or tube which is fitted into the expanded part 3 of the chamber in the car and serves as a base socket. It is formed with a horizontal flange 5 which supports it vertically and with lugs or webs 6 which are fitted into recesses in the metal at the top of the chamber and which serve to prevent rotation of the socket part 4, but do not interfere with its being readily lifted upward whenever desired. Within this socket there is fitted the trolley base 7. This has a cylindrical outer face fitting snugly the inner surface of the socket tube 4. It has a flange plate or ring at 8 which rests upon the flange 5 of the socket. It can rotate freely within the socket and is prevented from separating therefrom by means of a ring 9, which is secured to it by screws 10 or equivalent devices. The ring 9 lies immediately below the lower end of the socket tube 4 and the two parts 4 and 7 are thus held loosely together so far as rotation is concerned, but are prevented from separating.

The trolley base 7 is cast with two ears 11, 11, extending backward from the vertical axis and these are provided near their outer ends with horizontal bearing apertures 12.

13 indicates the trolley arm as a whole. The central or main body part is preferably made of wood, which, at the lower end, is fitted into a socket 14 preferably of cast metal having arms adapted to be clamped tightly against the wood. This socket 14 has a pivot bearing at 15 and also a downward and backward extending hook arm 16. This hook arm engages loosely with the upper end of a spring rod 16ᵃ. Preferably this rod at the upper end has a stirrup 17 provided with a pivot pin 18 which engages with the hook on arm 16. The stirrup 17 is situated in the chamber 19 of the trolley base piece. The stem part of the spring rod or link extends downward into the chamber 2 in the car body. Around the lower part of this rod or link there is placed a spring 20. At the lower end the spring is held by and it abuts against a disk 21 secured to the lower end of the rod. At the upper end the spring abuts against the trolley base, the latter preferably being formed with an inward extending flange 23 of such character that the spring can press against it as shown in the drawings. The spring 20 tends to force the disk 21 and the rod or link 16ª downward and the force thus exerted tends to pull downward on the hook arm 16 and force the trolley contact upward.

All of the parts connected with the lower end of the trolley arm can be turned around the vertical axis of the base sleeve or tube 4. The arm trails relatively backward from this axis, that is, in the direction opposite to that in which the vehicle is moving. As the car moves along there is more or less lateral swing of the arm because of the greater or less departures of the conductor wire from parallelism to the path of the vehicle. This swing is permitted by the pivotal connection of the base socket and the bearing tube or sleeve 4. It also permits the complete reversing of the trolley arm as the same movement as above described can be continued freely entirely around the vertical axis of the socket.

It will be seen that all of the movable parts here employed as mountings at the base of the trolley arm are permanently united together as a unitary structure and permit the trolley arm, its hinge, its spring and spring abutting devices to be quickly put into position in the socket and as readily detached, bodily. It will be further seen that all of the movable parts except the trolley arm itself and the upper end of the spring link, are concealed and protected.

I have so arranged the parts that the upper end of the spring is vertically stationary and held against an abutment which is detachable with the trolley arm. Under the circumstances where these devices are principally used, I find this construction superior to the constructions wherein use is made of expansion springs having their upper ends vertically movable.

I am aware that it has been proposed to employ a compression spring having its upper end movable and adapted to act through a plunger in pressing upward upon the trolley arm at a point above its main pivot; but in such constructions also the upper ends of the spring and the parts connected thereto are movable at points where they are apt to be exposed and to be interfered with by the accumulation of foreign materials that are deposited upon them. I am also aware that it has been proposed to so connect a spring that its upper end is non-movable and its lower end movable; but the earlier proposed constructions embodying this feature were objectionable for the reason that it was found necessary to have all of the parts in exposed position above the frame of the locomotive or car.

I have shown a contact mechanism of the ordinary sort the illustration in this respect being more or less conventional.

What I claim is:

1. A self-contained trolley arm and support, the said support being adapted to be set into or removed from a socket on a car, comprising a bearing, a support for the trolley arm fitting and free to turn in the bearing and consisting of a tube to which the arm is pivotally connected, a spring below the said tube by which the trolley arm is forced into working position, and a connection between the spring and the trolley arm through which the force exerted by the spring is transmitted to the arm.

2. A self-contained trolley arm and support, the said support being adapted to be inserted into a socket formed in a car body and to be freely removable therefrom, comprising a pair of concentrically disposed tubes to the inner one of which is pivoted the trolley arm, the outer one being adapted to be supported in the said socket, means for holding the tubes together against relative endwise movement while leaving them free to turn relatively about a longitudinal axis, a link connected with the trolley arm and extending downward through the said concentric tubes and beyond the lower ends thereof, and a spring surrounding the said link below the lower ends of the tubes, the said spring bearing at its upper end against one of the tubes and being connected at its lower end with the said link.

3. In combination with a railway car in which is formed a cavity, a bearing tube which is open at its lower end and which fits in the upper portion of the said cavity and is held against rotation therein, a trolley base fitting in the bearing tube and free to turn therein about a vertical axis, a trolley arm connected by a horizontal pivot with the trolley base, a link extending downward from the trolley arm below the lower ends of the said bearing tube and trolley base, a spring surrounding the said link and connected therewith at its lower end, and an abutment for the upper end of the spring which is non-movable vertically.

4. The combination of a railway car having formed in its frame a socket that extends below the top of the car, a trolley arm and a self-contained removable support upon which the arm is movably mounted, the support being arranged to be inserted into the said socket to freely turn therein about an axis longitudinal thereof, and comprising a link extending from the trolley arm into the said socket, and a spring also situated in the socket arranged to operate through the link to hold the trolley arm in operative position.

5. In combination with a railway car in which is formed a cavity extending below the top thereof, a socket-like trolley support fitting into the said cavity so as to be freely removable therefrom, a trolley arm connected with the said socket-like support by a pivotal joint, the trolley arm and its support being free to turn about a vertical axis, a link extending vertically downward from the trolley arm, and a coil spring with its upper end bearing against the said socket-like support and its lower end connected with the said link, these parts constituting a self-contained trolley support adapted to be removed from and inserted into the said cavity in the car.

6. In a mounting and supporting mechanism for an electric trolley apparatus, the combination of a trolley pole, a pole socket, a chambered support, a non-rotary bearing sleeve detachably held in the chamber in the support, a trolley supporting sleeve to which the pole socket is connected by a horizontal pivot, the sleeve being rotatably mounted in the bearing sleeve, means for holding the bearing sleeve and the trolley supporting sleeve together longitudinally whereby the two sleeves are detachable together from the chambered support, and a spring connected to the trolley pole socket and detachable with the two sleeves from the chambered support.

7. In a trolley stand, the combination of a non-rotary outer bearing sleeve, an inner sleeve rotatably mounted in the bearing sleeve, a trolley arm pivotally connected to the inner sleeve, a detachable collar at the lower ends of the said sleeves connected to one of them and adapted to hold the inner sleeve against upward movement relative to the outer sleeve, and a spring connected to the trolley arm and connected with the said sleeves.

8. In a mounting and supporting mechanism for an electric trolley apparatus, the combination of a non-rotary outer bearing sleeve, an inner rotary sleeve fitted in the bearing sleeve and having a flange at its upper end resting upon the bearing sleeve, a detachable collar at the lower end of the inner sleeve arranged to abut against the lower end of the bearing sleeve, a trolley pole socket pivotally connected to the inner rotatable sleeve, a spring, means connecting one end of the spring with the said trolley pole socket, and an abutment for the other end of the spring.

9. The combination of a railway car having formed in its frame a cavity that extends below the top of the car, a trolley arm and a self-contained removable support upon which the arm is movably mounted, the support being arranged to be inserted into the said cavity to freely turn therein about an axis longitudinal thereof, and comprising a connection extending from the trolley arm into the said socket, and a spring also situated in the socket and arranged to operate through the connection to hold the trolley arm in operative position.

10. The combination of a railway car having formed in its frame a cavity that extends below the top of the car, a trolley arm support adapted to be inserted into and to be freely removed from the cavity and to rotate therein about a vertical axis, a trolley arm movably mounted on the support, a spring located within the cavity and engaging at one end with the said support, and means for connecting the other end of the spring with the trolley arm to transmit the force of the spring to hold the arm in operative position.

11. The combination of a railway car having formed in its frame a cavity that extends below the top of the car, a trolley arm, a support upon which the arm is pivotally mounted, the support being adapted to be inserted into and to be freely removed from the cavity and to rotate therein about a vertical axis, a spring located within the cavity and engaging at one end with the said support, and means for connecting the other end of the spring with the trolley arm to transmit the force of the spring to hold the arm in operative position.

12. The combination of a railway car having a downward extending cavity in the top part of its frame, a trolley arm, a support upon which the trolley arm is pivotally mounted, means for holding the support to permit rotation about a vertical axis extending through the cavity, a spring located within the cavity and engaging with the support at one end, the spring as a whole being movable with the support as it is rotated, and means for connecting the other end of the spring with the trolley arm to hold the arm in operative position.

13. The combination of a railway car having a downward extending cavity in the top part of its frame, a trolley arm, a support upon which the trolley arm is pivotally mounted, means for holding the support to permit rotation about a vertical axis extending through the cavity, a spring located within the cavity and engaging with the support at its upper end, the spring as a whole being movable with the support as it is rotated, and means for connecting the lower end of the spring to the trolley arm to hold the arm in operative position.

In testimony whereof I affix my signature in presence of two witnesses.

FRED. C. COSEO.

Witnesses:
SAMUEL A. GARDNER,
CHARLES McCONKEY.